US010096397B2

United States Patent
Baek et al.

(10) Patent No.: US 10,096,397 B2
(45) Date of Patent: Oct. 9, 2018

(54) PLASTIC MOLDED PRODUCT COMPRISING COPPER-BASED COMPOUND MICROPARTICLES AND PREPARATION METHOD THEREFOR

(71) Applicant: BS SUPPORT CO., LTD., Suwon-si (KR)

(72) Inventors: Seung Woo Baek, Anyang-si (KR); Mun Sun Kim, Ansan-si (KR)

(73) Assignee: BS SUPPORT CO., LTD., Suwon-si (KR)

(*) Notice: Subject to any disclaimer, the term of this patent is extended or adjusted under 35 U.S.C. 154(b) by 0 days.

(21) Appl. No.: 15/817,966

(22) Filed: Nov. 20, 2017

(65) Prior Publication Data
US 2018/0096749 A1   Apr. 5, 2018

Related U.S. Application Data

(60) Division of application No. 14/705,218, filed on May 6, 2015, now Pat. No. 9,953,741, which is a
(Continued)

(30) Foreign Application Priority Data

Jan. 22, 2013  (KR) .................. 10-2013-0006761
Jul. 9, 2013   (KR) .................. 10-2013-0080215

(51) Int. Cl.
*H01B 1/22*   (2006.01)
*B29C 47/00*  (2006.01)
(Continued)

(52) U.S. Cl.
CPC ........... *H01B 1/22* (2013.01); *B29C 47/0019* (2013.01); *B29C 47/8805* (2013.01); *C08K 3/08* (2013.01);
(Continued)

(58) Field of Classification Search
CPC .. H01B 1/22; B29C 47/8805; B29K 2101/12; B29K 2105/0011; B29K 2505/10; B29K 2995/0005
(Continued)

(56) References Cited

U.S. PATENT DOCUMENTS 4,582,696 A    4/1986  Crosbie
5,180,585 A *  1/1993  Jacobson ............... A01N 25/26
                                                    424/404
(Continued)

FOREIGN PATENT DOCUMENTS

CN   101578043   11/2009
EP   0677989     9/1998
(Continued)

OTHER PUBLICATIONS

International Search Report—PCT/KR2013/011690 dated Apr. 16, 2014.
(Continued)

*Primary Examiner* — Harold Y Pyon
*Assistant Examiner* — Danny N Kang
(74) *Attorney, Agent, or Firm* — Cantor Colburn LLP

(57) ABSTRACT

Provided is a method for manufacturing a molded plastic products having copper-based compound particulates. The method includes the steps of: reacting copper sulfate with sulfuric salt, at a molar ratio of 1:1 in an aqueous solution at a temperature of 10~80° C., thereby synthesizing copper sulfide particulates; forming a sheet comprising the copper sulfide particulates dispersed in a thermoplastic resin.

5 Claims, 3 Drawing Sheets

Related U.S. Application Data continuation-in-part of application No. PCT/KR2013/011690, filed on Dec. 17, 2013.

(51) Int. Cl.
    *C08K 3/08* (2006.01)
    *C08L 101/00* (2006.01)
    *B29C 47/88* (2006.01)
    *B29K 101/12* (2006.01)
    *B29K 105/00* (2006.01)
    *B29K 505/10* (2006.01)

(52) U.S. Cl.
    CPC ........ *C08L 101/00* (2013.01); *B29C 47/8835* (2013.01); *B29K 2101/12* (2013.01); *B29K 2105/0011* (2013.01); *B29K 2505/10* (2013.01); *B29K 2995/0005* (2013.01); *C08K 2003/085* (2013.01); *C08K 2201/011* (2013.01)

(58) Field of Classification Search
    USPC ....................................................... 252/500
    See application file for complete search history.

(56) References Cited

U.S. PATENT DOCUMENTS

| | | | |
|---|---|---|---|
| 7,960,465 B2 | 6/2011 | Rathore et al. | |
| 8,053,356 B2 | 11/2011 | Chang et al. | |
| 8,431,494 B2 | 4/2013 | Murakami et al. | |
| 2008/0102122 A1* | 5/2008 | Mahadevan | A01N 59/16 424/484 |
| 2011/0306699 A1 | 12/2011 | Whang et al. | |

FOREIGN PATENT DOCUMENTS

| | | |
|---|---|---|
| KR | 1020050073436 | 7/2005 |
| KR | 100766418 | 10/2007 |
| KR | 1020080008814 | 1/2008 |
| KR | 1020090058007 | 6/2009 |
| KR | 1020090102742 | 9/2009 |
| KR | 1020100007443 | 1/2010 |
| KR | 1020100044104 | 4/2010 |
| KR | 100962268 | 6/2010 |
| KR | 1020100101700 | 9/2010 |
| KR | 1020110071523 | 6/2011 |
| KR | 1020110091783 | 8/2011 |
| KR | 1020130042463 | 4/2013 |

OTHER PUBLICATIONS

Wang, et al., Preparation of copper sulfide nanoparticles by direct precipitation method at normal temperature, Chemical Research, 2012, pp. 70-77.

\* cited by examiner

PLASTIC MOLDED PRODUCT COMPRISING COPPER-BASED COMPOUND MICROPARTICLES AND PREPARATION METHOD THEREFOR

CROSS REFERENCE TO RELATED APPLICATIONS

This application is a divisional application of U.S. Ser. No. 14/705,218, filed on May 6, 2015, which is a continuation-in-part application of International Application No. PCT/KR2013/011690, filed on Dec. 17, 2013, which claims priority to and the benefit of Korean Application Nos. 10-2013-0006761, filed on Jan. 22, 2013, and 10-2013-0080215, filed on Jul. 9, 2013, in the Korean Intellectual Property Office, the entire contents of which are incorporated herein by reference.

FIELD OF THE INVENTION

The present invention relates to molded plastic products having fine particles of copper-based compound and method of manufacturing the products, and more particularly, to molded plastic products having fine particles of copper-based compound with improved antibiosis and conductive property by dispersing copper sulfide particles having conductive property within the plastic resin and method of manufacturing the products.

BACKGROUND OF THE INVENTION

Recently, use of conductive molded plastic products is increasing in households, industrial fields, offices, etc. and the demand is gradually expanding especially in electronic goods. Conductive molded plastic products can be applicable in many fields such as touch panels, EL back lights, shields from electromagnetic waves, antistatic products, solar cells, radiation of heat, car window covers, fabrics, etc. Also molded plastic products to shield from electromagnetic waves are in the spotlight as materials because more people have an interest in maleficence of electromagnetic waves these days. Further, said molded plastic products are also used as materials for car in-mold films and building interior.

For example, hospitals use more expensive medical equipments producing a lot of electromagnetic waves. Therefore, development of molded plastic fabrics or wares with excellent conductivity such as electromagnetic waves shielding effectiveness and antistatic property is needed. On the other hand, indoor air pollution in hospitals is known to be a main cause for nosocomial infection. The influence of indoor air pollution in hospitals on newborn babies, elderly people and patients with weak immunity and resistance to pathogenic bacteria is significant. In general, 10~20% of nosocomial infection is by aerial infection, while the rest are indirect infection by molded products such as articles and wares used in hospitals.

Molded products that can induce infection include patients' bedding, hospital gowns, hospital workers' duty uniforms, plastic wares, etc. It is known that the number of nosocomial infection is 2.8~15.0% of inpatients. In order to reduce nosocomial infection, infection cases by fabrics and disposable plastic wares such as tubes, trays, components, etc. should be removed. That is why, development of plastic materials with excellent antibiosis is necessary. In other words, molded plastic products used in hospitals should satisfy both conductivity to shield micromagnetic waves and antibiosis to prevent from nosocomial infection.

For improving conductivity of molded plastic products, Korean Patent Application No. 2012-7022202 improved anti-electrostaticity by applying divalent cation of group 2 elements and salt of phosphoric ester. In addition, Korean Patent Application Nos. 2011-7014670, 2010-0101700 and 2009-0098692 provided conductivity of plastic materials by using organic salt having fluorine group and sulfonyl group. Korean Patent Application No. 2009-7006733 improved conductivity of plastic materials by adding a highly polymerized compound having PEO chains as a conductive basic structure. As stated in the cited references, salt of phosphoric ester, organic salt having fluorine group and sulfonyl group, etc. are simply applied to plastic products while easily improving conductivity. However, the drawback with using warm water is that conductivity of plastic wares sharply decreases. In addition, in case of producing plastic wares by compounding conductive polymers having PEO chains, deformation occurs because of non-uniformed crystallinity and crystal size by part.

There are prior studies on antibiosis of molded plastic products. Korean Patent Application No. 10-0559405 compounded 10~20 weight percent of sulfur powder having 1~3 μm of particle size with resin, while Korean Patent Application No. 10-0766418 produced plastic products with excellent antibiosis by compounding 1~600 nm silver nano powder and titanium dioxide with resin. Also Korean Patent Application No. 10-0987728 produced antibacterial yarn by depositing silver on the surface of resin using sputtering or ion plating, and then blending the deposited silver. Korean Patent Application No. 10-1180117 produced antibacterial yarn by dyeing zinc sulfide nano particles and organic antimicrobial.

However, there are a lot of limits to commercialization in spite that antibiosis of silver and sulfur ingredients used in the cited references is known to be excellent. Although silver has good antibiosis and convenience, its supply price is extremely high. In case of sulfur, there are several unsolved problems such as environmental problem, difficulties of manufacturing, etc. Also deposition or coating have low economic feasibility and efficiency as a method to get antibiosis.

SUMMARY OF INVENTION is to provide molded plastic products having fine particles of copper-based compound with relatively low price, simple process and good economic feasibility and productivity, and method of manufacturing the products.

Molded plastic products having fine particles of copper-based compound to solve objective of this invention has a chemical structure of $Cu_xM_y$, wherein M is any one selected from groups 15 to 17 of the periodic table, x/y is 0.5-1.5, while consisting of thermoplastic resin with dispersed copper-based compound.

In the molded plastic products of the present invention, said M can be one chosen from S, F and Cl, preferably M is S, while the fine particles of copper-based compound can be fine particles of copper sulfide. In addition, it is preferable that the fine particles is greater than 0 wt % but smaller than 50 wt % of the total weight.

Preferable molded products of the present invention can include the copper sulfide fine particles, 0.1~40 wt % of the total weight is included, and concentration of sulfur is 10~60 mole %, 0.1~5 wt % of the total weight is included, and can be chosen from chrome, manganese, iron, cobalt, nickel or zinc.

The thermoplastic resin of the molded products by working examples in the present invention can be at least one chosen from polyethylene trephthalate, polylactic acid, polyethylene, polypropylene, polycarbonate, polyamaide, polymetamethylacrylate and polyvinylchloride. In addition the thermoplastic resin can be in order of olefin resin, polyethylene trephthalate and polycarbonate as the size of the molded products gets bigger. Further, the average diameter of the metal fine particles can be smaller than that of the copper sulfide fine particles.

Method of manufacturing molded plastic products having fine particles of copper-based compound to solve the objective of the present invention is as follows. First, synthesize copper sulfide fine particles by reacting salt chosen from copper sulfate, sulfide salt, fluoride salt, chloride salt with aqueous solution in the mole ratio of 1:1. And then, disperse the fine particles onto the thermoplastic resin.

The sulfide salt of the present invention can be one chosen from sodium sulfide, iron sulfide, potassium sulfide and zinc sulfide. The sulfide salt can be sodium sulfide, while the fluoride salt can be one chosen from sodium fluoride, iron fluoride, potassium fluoride and zinc fluoride. Also the chloride salt can be one chosen from sodium chloride, iron chloride, potassium chloride and zinc chloride.

In the preferable manufacturing method of the present invention, the copper sulfate particles can be dispersed onto the thermoplastic resin by compounding. In addition, the manufacturing method can include a step of synthesizing the copper sulfate fine particles and 10~60 mole % of sulfur concentration, a step of forming sheets on which 0.1~5wt % of metal fine particles that is at least one chosen from chrome, manganese, iron, cobalt, nickel or zinc are dispersed, and a step of manufacturing molded plastic products using said sheets.

In the manufacturing method of the present invention, the sheets are formed by extrusion, and molded plastic products can be produced by the primary cooling, heat treatment and the secondary cooling. At this stage, 0.05~1($\Delta$P/h) is preferable as pressure of extrusion to form the sheets.

According to molded plastic products having fine particles of copper-based compound and method of manufacturing the products to solve the objective of the present invention, production of molded plastic products with dispersed copper-based fine particles onto the thermoplastic resin can offer cheaper and easier process while increasing economy feasibility and productivity. In addition, the sheets can be easily produced by lowering pressure of extrusion without hindering antibiosis and conductivity of copper sulfate through adding at least one chosen from transition metals in the 4th period of the periodic table such as chrome, manganese, iron, cobalt, nickel or zinc.

DESCRIPTION OF EMBODIMENTS

Figure 1:
FIG. 1 is a picture that shows copper sulfate fine particles manufactured by the examples of the present invention.

As the present invention may be embodied in several forms without departing from the characteristics thereof, it should also be understood that the embodiments described in the present invention are not limited by any of the details of the foregoing description, therefore, various variations are possible by a person of ordinary skill in the pertinent art within the range of technical features of the present invention.

Examples of the present invention provide molded plastic products that are relatively cheaper and easier to produce and have fine particles of copper-based compound with economy feasibility and productivity and method of manufacturing the products by manufacturing molded plastic products with copper-based fine particles having copper sulfate dispersed onto the thermoplastic resin. For this, method of producing molded plastic produced by dispersing fine particles of copper-based compound having copper sulfate onto the thermoplastic resin will be disclosed in detail. In addition, antibiosis and conductivity of the molded plastic products will also be disclosed in detail.

In this invention, molded plastic products means products manufactured by extruding or injecting polymeric resin having fine particles of copper-based compound having copper sulfate. Molded plastic products such as fabric or wares can be manufactured through said process. Molded plastic products will be divided into molded fabric products and molded ware products in the following explanation. On the other hand, surface coating methods such as deposition or dyeing are not used to manufacture molded plastic products with improved antibiosis and conductivity in this invention considering economic feasibility and productivity. That is, the present invention chooses dispersing copper-based fine particles having antibiosis and conductivity inside and compounding with resin.

<Production of Molded Fabric Products>

Resins that can be used to produce molded fabric products in the present invention include polypropylene, polyethylene trephthalate, polylactic acid, polyamaide, etc., but not limited to those resins. That is, any resin chosen from the thermoplastic resin group that can be used as a materials for molded fabric products can be applied. Especially, polylactic acid (PLA) is a highly polymerized resin that is produced by fermenting starch from potatoes, corn, etc. polylactic acid (PLA) not only has excellent mechanical property, but also has good biodegradation. Accordingly, the use of polylactic acid (PLA) for fabric, films, molding and medical equipment is gradually increasing. The drawback of polylactic acid (PLA) is that it has lower mechanical property and heat resistivity that polyester resins such as polyethylene trephthalate, a petroleum-based resin. However, the above drawback is gradually improving through the synthesis of copolymer.

Copper-based fine particles in the present invention can include copper sulfide(CuS), copper fluoridation($CuF_2$), copper chloride($CuCl_2$), etc. however, copper sulfide(CuS) is preferable among them. Copper sulfide are synthesized in forms of fine particles by reacting salt chosen from copper sulfate, sulfide salt, fluoride salt, chloride salt with aqueous solution in the mole ratio of 1:1. The chemical structure of the synthesized copper sulfide is $Cu_xM_y$, and the synthesis condition is limited in order to satisfy 0.5~1.5 of the x/y ratio. Here, M means S, F and Cl, but is not limited to them. In addition, M is all kinds of organic components that can produce copper sulfide fine particles by methods mentioned in the present invention. More concretely, M can be one that is chosen from groups 15 to 17 in the periodic table.

Kinds of sulfide salt that can be used in the present invention can include sodium sulfide, iron sulfide, potassium sulfide, zinc sulfide, etc., while the fluoride salt can be one chosen from sodium fluoride, iron fluoride, potassium fluoride, zinc fluoride, etc. Also the chloride salt can be one chosen from sodium chloride, iron chloride, potassium chloride, zinc chloride, etc. Among them, copper sulfide that is synthesized using sodium sulfide and copper sulfate has best antibiosis and deodorization.

On the other hand, if the reaction temperature is below 10° C., the average grain size becomes smaller because reactivity of copper sulfate and salt decreases when synthesizing copper-based particles. Accordingly, antibiosis is good while deodorization becomes worse. If the reaction temperature is over 80° C., density of crystals on the surface of copper sulfide and concentration of copper increase because reaction speed is extremely fast. Accordingly, deodorization is good while antibiosis becomes worse. In addition, if the x/y coupling ratio of the copper-based fine particles is below 0.5, concentration of S, F, Cl, etc. increases excessively. In this case, antibiosis becomes better while deodorization becomes worse. Also in case of over 1.5, concentration of copper increases resulting in better deodorization and worse antibiosis.

In examples of the present invention, it is proper to use compounding process in order to maintain antibiosis and deodorization of fabric for a long time by increasing dispersibility of copper-based fine particles in the thermoplastic resin. Compounding process means mixing more than two kinds of solid matters in a certain component ratio at a certain temperature for a certain amount of time, and then producing master chips by extruding, cooling and cutting. In the compounding process of the present invention, greater than 0 wt % but smaller than 50 wt % of limited thermoplastic resin and copper-based fine particle are mixed at barrel temperature which is 30~50° C. higher than the melting temperature of the resin. If concentration of the copper-based fine particles is 0 wt %, improvement of antibiosis cannot be confirmed. Also if concentration of the copper-based fine particles is higher than 50 wt %, antibiosis and deodorization, but the dispersion state of master chips becomes worse. As a result, the thread breaks during thread process.

For compounding process, a compounder with a built-in biaxial and same direction screw is more preferable than a compounder with a single axis screw because it is better dispersibility. Also it is preferable that the L/D range of the compounding equipment is between 30 and 40. The composition of the compounded master chips includes previously known materials for improving property and process as well as the copper-based fine particles in the thermoplastic resin. The previously known materials can be organic adding agents such as compatibilizing agent, dispersing agent, antistatic agent, dying agent, etc., inorganic adding agents for improving activity and functionality, and other metal fine particles. The composition of master chips produced by the compounding process can be diversified according to purpose of use and usage. That is, fiber produced by previously known equipment was produced to fabric for patients' bedding, hospital gowns, hospital workers' duty uniforms, indoor wallpaper of hospitals, etc.

The present invention is described in more detail by examples and comparative examples, but the examples are only illustrative and, therefore, not intended to limit the scope of the present invention. Performance evaluation for fiber produced by the examples and the comparative examples in the present invention was implemented as follows.

(1) Average Diameter

The average diameter of copper-based fine particles are measured with a grain size analyzer (ELS-Z2, Otsuka Electronics Co., Japan)

(2) Ingredient Analysis (x/y composition)

Ingredients of copper-based fine particles ($S_xM_y$) are analyzed by measuring concentration of Cu and M (one of S, F and Cl) with an inductive coupling plasma mass analyzer (Agilent 7500, Aglient Technologies Inc., U.S.).

(3) Antibiosis

Test lysate was contacted to a specimen using *Escherichia Coli* (ATCC 25922) as cultures. Then, the test lysate was cultivated by placing at a constant position at 25° C. for 24 hours. And then, antibiosis of the specimen was evaluated by counting the number of bacteria.

(4) Deodorization 1 g of copper-based fine particles and 10,000 ng/mL of vapor phase formaldehyde were put in a reactor. Then, deodorization of the copper-based fine particles was evaluated by calculating concentration of removed formaldehyde after 5 minutes. At this time, concentration of remained vapor phase formaldehyde was measured with a gas chromatography (Agilent 6890, Aglient Technologies Inc., U.S.)

EXAMPLE 1

Figure 2:
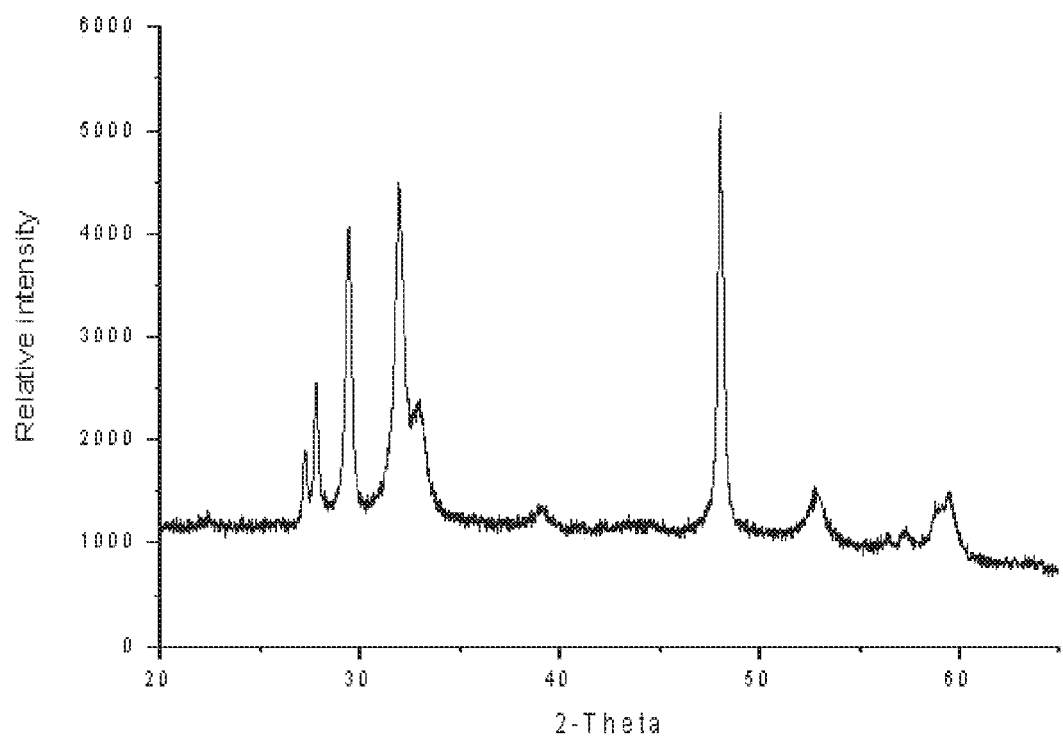
FIG. 2 is an XRD graph that shows the crystal structure of copper sulfate manufactured by the examples of the present invention.
Figure 3:
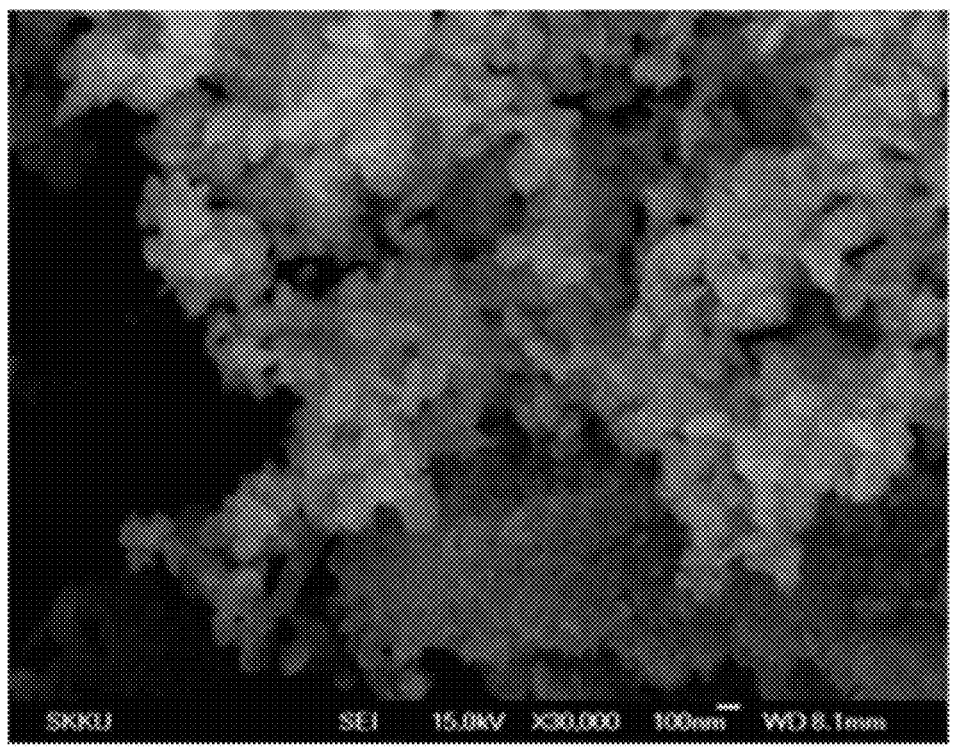
FIG. 3 is a photomicrograph in which copper sulfate manufactured by the examples of the present invention is magnified by a factor of 30,000.

Aqueous solution was manufactured by mixing 1 mole of $CuSO_4$ and $Na_2S$ respectively with deionized water for 30 minutes. Then, copper sulfide (CuS) as shown in FIG. 1 was synthesized by reacting the aqueous solution at 50° C. in an isothermal reactor. At this stage, the x/y ratio of the synthesized ingredient was 1.02. The crystal structure of the synthesized copper sulfide has a unique structure for copper sulfide as shown in FIG. 2. FIG. 3 illustrates shapes of the grains observed with a microscope of 30,000 magnification. According to FIG. 3, there are no peaks because sulfur has no crystal structure, but copper presented peaks at 55, 65, 99, 125 and 137 degrees.

X-ray powder diffraction (XRD, XD-3A, Shimadzu, Japan) was used to observe the fine particles. And then, 40 wt % of copper sulfide was input in PLA resin with a density of 1.2 (g/cm³), and master chips were made using a compounder with 30 of L/D and a built-in biaxial and same direction screw. Continually, molded fabric products were manufactured by threading the master chips. Nextly, antibiosis and deorderization of the fabric products were measured as proposed above.

EXAMPLE 2

Copper sulfide (CuS) fine particles with the x/y ratio of 1.15 were synthesized by the same method in Example 1. Then, 10 wt % of the copper sulfide was input in PLA resin with a density of 1.2(g/cm³). Thereafter, fabric molded products were made by the same method in Example 1, and antibiosis and deorderization of the fabric products were measured.

EXAMPLE 3

Copper sulfide (CuS) fine particles with the x/y ratio of 1.08 were synthesized by the same method in Example 1 using $CuSO_4$ and $K_2S$ instead of $CuSO_4$ and $Na_2S$ of Example 1. Then, 20 wt % of the copper sulfide were input in PA resin. Thereafter, fabric molded products were made by the same method in Example 1, and antibiosis and deorderization of the fabric products were measured.

EXAMPLE 4

Copper fluoride ($CuF_2$) fine particles with the x/y ratio of 1.10 were synthesized by the same method in Example 1 using $CuSO_4$ and NaF instead of $CuSO_4$ and $Na_2S$ of Example 1. Then, 50 wt % of the copper fluoride was input in PP resin. Thereafter, fabric molded products were made by the same method in Example 1, and antibiosis and deorderization of the fabric products were measured.

EXAMPLE 5

Copper chloride ($CuCl_2$) fine particles with the x/y ratio of 1.05 were synthesized by the same method in Example 1 using $CuSO_4$ and NaCl instead of $CuSO_4$ and $Na_2S$ of Example 1. Then, 5 wt % of the copper chloride was input in PET resin. Thereafter, fabric molded products were made by the same method in Example 1, and antibiosis and deorderization of the fabric products were measured.

COMPARATIVE EXAMPLE 1

A fabric molded product was made of low-density polyethylene (LDPE) and having a diameter of 1 cm and a length of 10 cm was prepared, and the antibacterial activity thereof was measured according to the above-described method.

Table 1 shows comparison among Examples 1 to 5 and Comparative Examples 1 by areas such as the composition ratio of x/y, the diameter of particles (nm), antibiosis (no./mL) and the deodorization (%) of the copper based fine particles, and antibiosis (no./mL) of the molded fabric products according to weight % of the copper based fine particles in the thermoplastic resin. Here, "N/A" means inaccessible measurement because the number of bacilli of *Escherichia Coli* (ATCC 25922) is over $10^{10}$.

eneterephthalate, polylatic acid, polyethylene, polypropylene, polycarbonate, polymethylmethacrylate, polyvinylchloride, polyamide and so on. Since polyvinylchloride (PVC) has excellent workability, up to now, it is widely used as a material for a disposable container in medicine. As environmental regulations in the use of polyvinylchloride become seriously determined due to the generation of hazardous substances upon the combustion of polyvinylchloride, a quantity of polyvinylchloride consumption becomes reduced. Contrarily, olefin resin such as low density polyethylene (LDPE), high density polyethylene (HDPE), polypropylene (PP), etc. is increased in the quantity consumed. At this time, the container includes a receptacle as a fiber molded product for containing objects, and in addition thereto, the container may include consumable goods like tubes and other parts.

The resins used in the present invention are different according to the sizes of the container. According to the viscosity characteristics of the resins, that is, a relatively small-sized container is made of olefin resins like PP and PE, and a middle-sized container is desirably made of polyethyleneterephthalate (PET). A relatively large-sized container is desirably made of polycarbonate (PC). Polymethylmethacrylate (PMMA) and polyvinylchloride (PVC) are generally used for consumable goods in hospital like tubes or other parts. Recently, polylatic acid (PLA) as a bio material derived from corn or potatoes has been used for an injection molded product.

The molded product for a container according to the present invention is made by mixing the thermoplastic resin with 0 to 50 wt % of fine particles of copper-based sulfide and 0.1 to 5 wt % of fine particles of at least one metal selected from the group consisting of chrome, manganese, iron, cobalt, nickel, and zinc, at the same time. At this time,

TABLE 1

| | | Reactants | | Reaction | Copper based fine particle | | | Molded fabric products | | |
|---|---|---|---|---|---|---|---|---|---|---|
| | | | | | | | | | Copper based fine particle | |
| | | Copper sulfate | Salt | Temp. (° C.) | x/y | Antibiosis (No./mL) | Deodorization (%) | Resin | Resin | Content (wt %) | Antibiosis (No./mL) |
| Examples | 1 | $CuSO_4$ | $Na_2S$ | 50 | 1.02 | $2.5 \times 10^2$ | 75 | PLA | CuS | 40 | $1.3 \times 10^5$ |
| | 2 | $CuSO_4$ | $Na_2S$ | 80 | 1.15 | $2.9 \times 10^2$ | 85 | PLA | CuS | 10 | $3.2 \times 10^6$ |
| | 3 | $CuSO_4$ | $K_2S$ | 65 | 1.08 | $3.5 \times 10^2$ | 62 | PA | CuS | 20 | $9.2 \times 10^5$ |
| | 4 | $CuSO_4$ | NaF | 70 | 1.10 | $2.1 \times 10^2$ | 60 | PP | $CuF_2$ | 50 | $1.3 \times 10^4$ |
| | 5 | $CuSO_4$ | NaCl | 60 | 1.05 | $2.0 \times 10^2$ | 67 | PET | $CuCl_2$ | 5 | $6.5 \times 10^6$ |
| Comp. Examples | 1 | / | / | / | / | / | 5 | LDPE | / | / | N/A |

According to Table 1, copper based fine particles of Examples 1 to 5 of the present invention were $Cu_xM_y$, wherein M is chosen from groups 15 to 17 in the periodic table. Also the copper based fine particles have x/y ratios between 0.5 and 1.5 Then, antibiosis of the copper based fine particles falls within the range of $2.0 \times 10^2 \sim 3.5 \times 10^2$ (no./mL) while deodorizations 60~85%. In addition, antibiosis of the molded fabric products consisting of 5~50 wt % of fine particles of the said examples was $1.3 \times 10^4 \sim 6.5 \times 10^6$. However, the antibacterial activity of the product of Comparative Example 1, was very low such that it could not be measured. And the deodorization is very low.

Manufacturing Molded Container

A Molded Product for a container according to the present invention is made of thermoplastic resin such as polyethylthe mixed fine particles of copper-based sulfide desirably contain 10 to 60 mol % of sulfide. If the fine particles contain less than 10 mol % of sulfide, antimicrobial efficiencies become bad, and contrarily, if more than 60 mol % of sulfide, conductivity becomes bad.

On the other hand, if only the fine particles of sulfide like copper sulfide is distributed to the thermoplastic resin and made to the form of fiber, they can be sufficiently used as a fiber molded product having improved antimicrobial efficiencies and conductivity. By the way, if the fine particles of sulfide are made to the form of a sheet for the use of the molded product for a container, their distribution becomes deteriorated to cause a pressure (extrusion pressure) to be raised. In case of a fine-sized sheet, good antimicrobial efficiencies and conductivity can be obtained through the fine particles of sulfide, but in case of a relatively large-sized sheet, the increment of the extrusion pressure should be considered.

So as to prevent the extrusion pressure from being raised, accordingly, 0.1 to 5 wt % of fine particles of at least one metal selected from the group consisting of chrome, manganese, iron, cobalt, nickel, and zinc, which are transition metals selected in the period 4 of a periodic table are added. If the transition metals are mixed with the copper-based compound, they have more excellent distribution, antimicrobial efficiencies and conductivity when compared with main group metals like Al.

So as to reduce the extrusion pressure, on the other hand, the average sizes of the fine particles of metal are desirably smaller than those of the fine particles of copper-based sulfide. In the process where the fine particles of metal are mixed with the thermoplastic resin, further, if the mixed concentration of the fine particles of metal is less than 0.1 wt % or more than 5 wt %, the extrusion pressure is increased. As mentioned above, the fine particles of metal are added just to control the extrusion pressure, and the appropriate antimicrobial efficiencies and conductivity are obtained through the copper-based sulfide. Therefore, the molded product for a container according to the present invention can be made, without the addition of the fine particles of metal. Of course, the added fine particles of metal are appropriately selected so that they do not give any bad influence on the antimicrobial efficiencies and conductivity required for the molded product for a container according to the present invention. At this time, the extrusion pressure for molding is desirable in the range of 0.05 to 1 $\Delta P/h$.

According to the present invention, mixing was adopted to enhance the distribution between the resin and the fine particles and thus conducted at a barrel temperature higher by 30 to 50° C. than the melting temperature of the resin. The mixing was carried out by means of a mixer wherein co-rotating twin screws having more excellent distribution than a single screw are embedded. The ratio of L/D of the mixer was in the range of 30 to 40. The mixed resin was kept to a form of chips in a bunker, and after that, the chips were extruded at the condition of the extrusion temperature higher by 30 to 50° C. than the melting temperature of the used plastic resin. Next, molding, first cooling, heat treatment, and second cooling were carried out sequentially to make a plastic container having a desired shape.

What is claimed is:

1. A method for manufacturing a molded plastic products, the method comprising the steps of:
    reacting copper sulfate with sulfuric salt, at a molar ratio of 1:1 in an aqueous solution at a temperature of 10~80° C, thereby synthesizing copper sulfide particulates; and
    dispersing the copper sulfide particulates in a thermoplastic resin to form a molded plastic product,
    wherein the copper sulfide particulates have a chemical structure of $Cu_xS_y$, satisfying x/y=0.8 to 1.5, x and y representing values greater than 0;
    the molded plastic product has an antibioisis that increases gradually as the x/y decreases; and
    the copper sulfide particulates have an X-ray diffraction pattern that includes peaks corresponding to a crystal structure of copper.

2. The method of claim 1, wherein the molded plastic product has a sulfur concentration of 10-60 mole %.

3. The method of claim 1, wherein the copper sulfide particulates are contained in the thermoplastic resin in an amount of less than 50 wt % based on a total weight of the molded plastic product.

4. The method of claim 1, wherein the dispersing further comprises; dispersing 0.1-5wt % of metal particulates based on a total weight of the molded plastic product, wherein the metal particles have an average particle size smaller than that of the copper sulfide particulates, and the metal particles are formed of at least one metal selected from the group consisting of chromium, manganese, iron, cobalt, nickel and zinc.

5. The method of claim 4, wherein the dispersing further includes:
    extruding the copper sulfide particulates and the thermoplastic resin in a form of sheet, wherein the sheet is subjected to primary cooling, heat treatment and secondary cooling formed by extrusion, and the formed sheet is subjected to primary cooling.

* * * * *